(12) United States Patent
Baeuerle et al.

(10) Patent No.: US 8,683,436 B2
(45) Date of Patent: Mar. 25, 2014

(54) TIMER PATTERNS FOR PROCESS MODELS

(75) Inventors: Stefan A. Baeuerle, Rauenberg (DE); Marek K. Kowalkiewicz, St. Lucia (AU); Marita A. Kruempelmann, Dielheim (DE); Ruopeng Lu, Taringa (AU)

(73) Assignee: SAP AG, Walldorf (DE)

( * ) Notice: Subject to any disclaimer, the term of this patent is extended or adjusted under 35 U.S.C. 154(b) by 1359 days.

(21) Appl. No.: 11/960,635

(22) Filed: Dec. 19, 2007

(65) Prior Publication Data
US 2009/0165001 A1   Jun. 25, 2009

(51) Int. Cl.
*G06F 9/44* (2006.01)

(52) U.S. Cl.
USPC .......................................... 717/121; 717/105

(58) Field of Classification Search
None
See application file for complete search history.

(56) References Cited

U.S. PATENT DOCUMENTS

| | | | | |
|---|---|---|---|---|
| 5,887,143 | A * | 3/1999 | Saito et al. | 709/248 |
| 6,195,701 | B1 * | 2/2001 | Kaiserswerth et al. | 709/231 |
| 6,725,428 | B1 * | 4/2004 | Pareschi et al. | 715/205 |
| 6,725,445 | B1 * | 4/2004 | Leymann et al. | 717/101 |
| 6,941,514 | B2 * | 9/2005 | Bradford | 715/700 |
| 7,089,071 | B2 * | 8/2006 | Lilly et al. | 700/100 |
| 7,103,874 | B2 * | 9/2006 | McCollum et al. | 717/121 |
| 7,451,432 | B2 * | 11/2008 | Shukla et al. | 717/106 |
| 7,487,464 | B2 * | 2/2009 | Grotjohn et al. | 715/797 |
| 7,599,964 | B1 * | 10/2009 | Bozek et al. | 1/1 |
| 7,669,185 | B2 * | 2/2010 | Vrancic et al. | 717/121 |
| 7,945,894 | B2 * | 5/2011 | Peck et al. | 717/109 |
| 2001/0044738 | A1 * | 11/2001 | Elkin et al. | 705/8 |
| 2004/0133457 | A1 * | 7/2004 | Sadiq et al. | 705/7 |
| 2005/0050529 | A1 * | 3/2005 | Vrancic et al. | 717/150 |
| 2005/0055664 | A1 * | 3/2005 | Kloppmann et al. | 717/100 |
| 2005/0278301 | A1 * | 12/2005 | Castellanos et al. | 707/3 |
| 2006/0224432 | A1 * | 10/2006 | Li | 705/9 |
| 2008/0215409 | A1 * | 9/2008 | Van Matre | 705/8 |
| 2009/0138115 | A1 * | 5/2009 | Shin et al. | 700/104 |
| 2010/0217418 | A1 * | 8/2010 | Fontanot | 700/100 |

* cited by examiner

*Primary Examiner* — Lewis A Bullock, Jr.
*Assistant Examiner* — Christine Dang
(74) *Attorney, Agent, or Firm* — Mintz Levin Cohn Ferris Glovsky and Popeo, P.C.

(57) ABSTRACT

The subject matter disclosed herein provides methods and apparatus, including computer program products, for providing timers for tasks of process models. In one aspect, an input representative of a temporal constraint for a task of a graph-process model may be received. The temporal constraint defines at least one of a delay or a deadline. The task may be associated with the temporal constraint created based on the received input. The temporal constraint defined to have a placement at the graph-process model based on the type of temporal constraint. The task and the temporal constraint may be provided to configure the process model. Related systems, apparatus, methods, and/or articles are described.

15 Claims, 24 Drawing Sheets

| Associated Task State | Type of Constraints | Type of Timing | Pattern of Temporal Constraints |
|---|---|---|---|
| Commencement | Delay | Absolute | Absolute Commencement Delay |
| | | Relative | Relative Commencement Delay |
| | | Interrelated | Interrelated Commencement Delay |
| | Deadline | Absolute | Absolute Commencement Deadline |
| | | Relative | Relative Commencement Deadline |
| | | Interrelated | Interrelated Commencement Deadline |
| Completion | Delay | Absolute | Absolute Completion Delay |
| | | Relative | Relative Completion Delay |
| | | Interrelated | Interrelated Completion Delay |
| | Deadline | Absolute | Absolute Completion Deadline |
| | | Relative | Relative Completion Deadline |
| | | Interrelated | Interrelated Completion Deadline |

FIG. 6

| ... | ... |
|---|---|
| Rule 26 | ... |
| Rule 27 | ON execute T2<br>IF SysDate ≥ 2007/11/15<br>DO set T2 commenced |
| Rule 28 | ... |
| ... | ... |

FIG. 10

TIMER PATTERNS FOR PROCESS MODELS

FIELD

The subject matter described herein relates generally to process models and, more particularly, to timer patterns for process models.

BACKGROUND

To implement business strategies successfully, business-management concepts, including business processes, may be implemented in enterprise systems with the help of process models. In general, a process model refers to an abstraction of a process, such as a business process, in terms of the activities and their related roles and artifacts. For example, a process model may be developed for purchasing inventory, from which an executable instance of the process model may be generated, where the executable instance of the process model may reflect an underlying business process for purchasing inventory.

SUMMARY

The subject matter disclosed herein provides methods and apparatus, including computer program products, for providing timers for tasks of process models. In one aspect, an input representative of a temporal constraint for a task of a graph-process model may be received. The temporal constraint defines at least one of a delay or a deadline. The task may be associated with the temporal constraint created based on the received input. The temporal constraint is defined to have a placement at the graph-process model based on the type of temporal constraint. The task and the temporal constraint may be provided to configure the process model.

In some variations, one or more of the following may be included. A process modeling system may receive from a user interface input representative of a temporal constraint. A task and the temporal constraint may be provided to the user interface for presentation. Input representative of the temporal constraint of the task may include a commenced state and a completed state. The placement of the temporal constraint may be defined based on whether the type of the temporal constraint represents the deadline or the delay. A graphical notation for a graph-based process model including the task may be defined. The graphical notation may represent an element having four borders including a commencement delay on a left border, a completion delay on a right border, a commencement deadline on a top border, and a completion deadline on a bottom border.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

In the drawings,

FIG. 6 depicts a table of temporal constraint patterns;

FIG. 10 depicts a rule-based process model for a timer pattern of absolute commencement delay;

Figure 1:
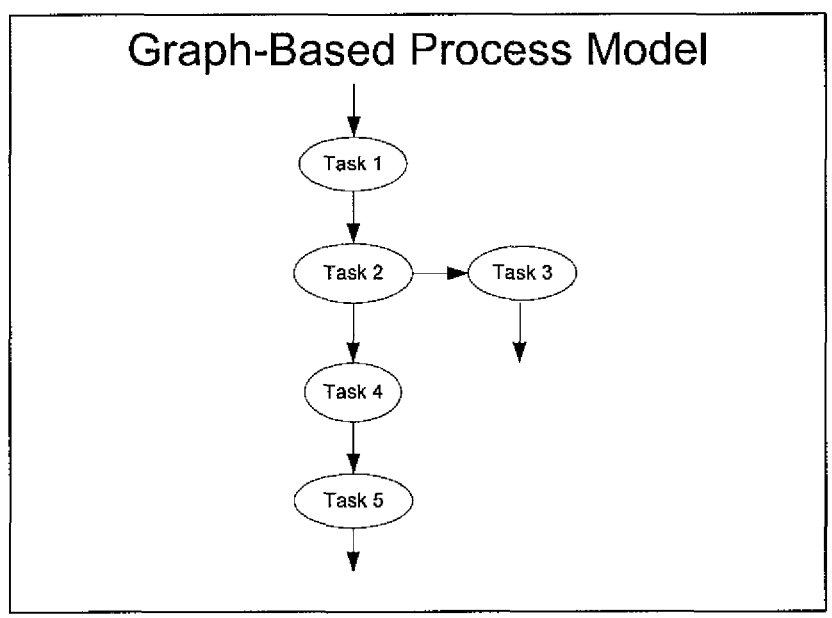
FIG. 1 depicts a graph-based process model.

Like labels are used to refer to same or similar items in the drawings.

DETAILED DESCRIPTION

Graph-based modeling is an approach to modeling a process, such as a business process. Under the graph-based modeling approach, tasks and their associated conditions and restrictions of the process being modeled are represented in the form of graphs. A graph-based process model provides visualization of a process model in an intuitive way, so that it is easier for a user to understand and interact. A process model is a template, a so-called "blueprint," for processes, such as business processes, workflows of one or more tasks, and work processes. A user interface may be used to graphically manipulate tasks of a graph-based process model.

FIG. 1 shows an example of a graph-based process model. In FIG. 1, task 1 through task 5 are represented using ovals as graphical elements. The relationships among those tasks may be represented using graphical elements, such as directional connectors (depicted as arrows). The graph-based process model of FIG. 1 depicts the workflow including task 1, followed by task 2, which is followed by task 3 or, alternatively, by task 4, while task 5 follows task 4. A user interface may be used to graphically manipulate (e.g., change the sequence of tasks, add tasks, and the like) the graph-based process model of tasks 1-5.

Figure 2:
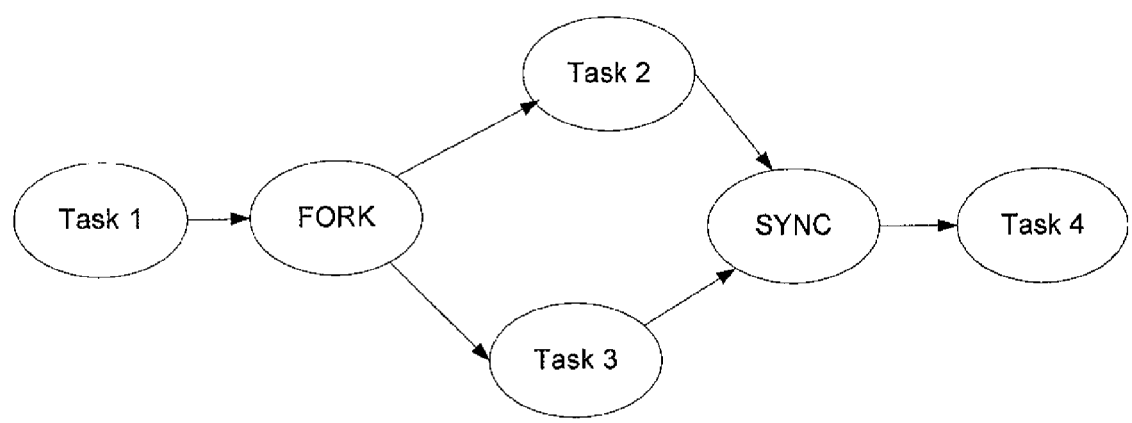
FIG. 2 depicts a graph-based process model.

FIG. 2 depicts another graph-based process model that may be considered more complex than the graph-based process model of FIG. 1. For example, there is a fork element and synchronization element that indicate more complex relationships among tasks. In addition to these elements, in a graph-based modeling language there may be a variety of modeling elements placed between tasks to indicate relationships among task or to coordinate a flow across tasks.

Figure 3:
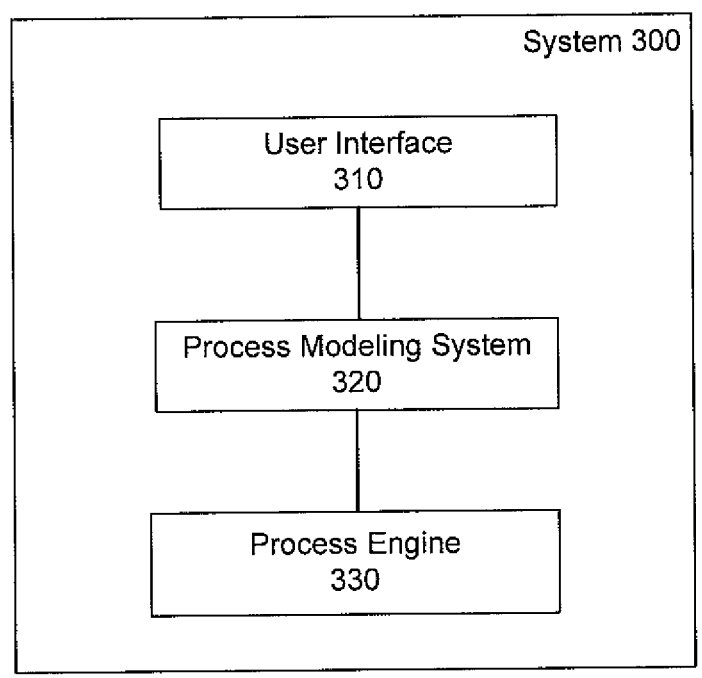
FIG. 3 depicts a block diagram of a system for process modeling.

FIG. 3 depicts a system 300 for process modeling, including a user interface 310, a process modeling system 320, and a process engine 330.

User interface 310 provides an interface to process modeling system 320. User interface 310 may provide input data (e.g., data regarding a task) to process modeling system 320 and present any output provided by processing modeling system 320. For example, user interface 310 may be implemented as a browser or a client application for interacting with one or more components of system 300. The user interface 310 may be used to manipulate (e.g., change the sequence of tasks, add tasks, and the like) of a process model, such as a graph-based process model at process modeling system 320. Process modeling system 320 generates and maintains one or more process models, such as graph-based process models (e.g., FIG. 1 and FIG. 2). Those process models are generated and maintained by process modeling system 320 and executed by process engine 330.

Process modeling system 320 may associate tasks in a process model (e.g., as illustrated in FIG. 1 and FIG. 2) with one or more constraints, such as entrance requirements (e.g., $Condition_x$ must be satisfied before $Task_p$ starts) or exit requirements (e.g., $Condition_y$ must be satisfied before $Task_q$ is finished). A constraint may be temporal, such as time. For example, time may be used when process modeling system 320 models a process in a graph-based process model (e.g., as illustrated in FIG. 1 and FIG. 2). Without temporal constraints, a task of a process may start execution immediately after a preceding task is complete. Using temporal constraints allows process modeling system 320 to regulate the start time and/or end time of the tasks of a process.

Implementation of a graph-based model in an executable environment, which may be referred to as a run-time environment, may vary. One approach may be to transform a graph-based model to a rule-based model of Event-Condition-Action ("E-C-A") rules to be processed by a process engine.

Figure 4:
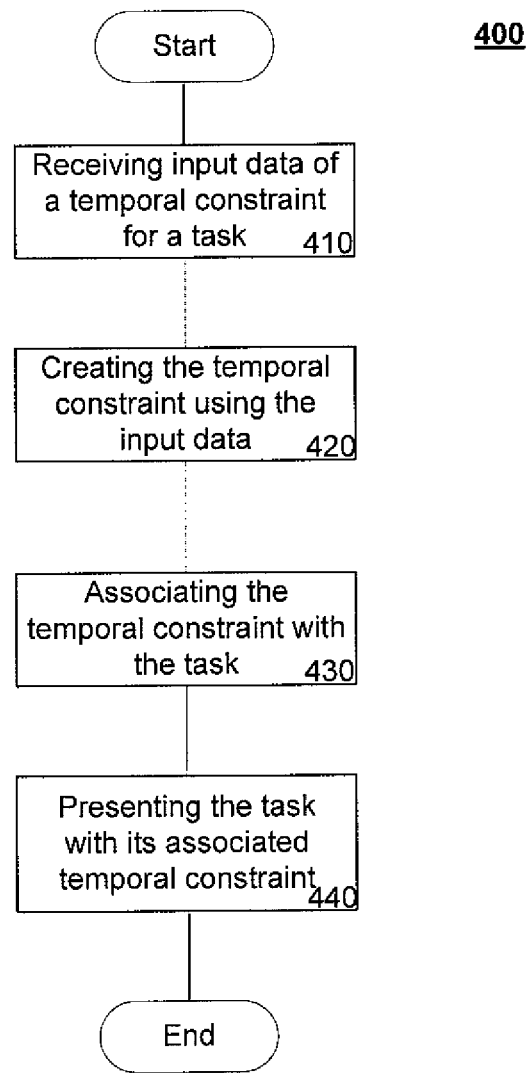
FIG. 4 depicts a process for creating a temporal constraint for a task.

FIG. 4 shows a process 400 for generating a temporal constraint for a task of a process model, such as a graph-based process model (e.g., as illustrated in FIG. 1 and FIG. 2).

At 410, user interface 310 receives input data of a temporal constraint for a task. The input data includes information about a particular temporal constraint, such as the exact time requirement, the time requirement's relationship (if any) to other tasks in the process model, the task associated with the temporal constraint, whether the temporal constraint is for starting the task or for finishing the task, and any other information about the temporal constraint. A user of system 300 may manually enter the input data at user interface 310 via an input device (e.g. computer keyboard, computer mouse, etc.). For example, user interface 310 may be used to provide a time after which task 2 (FIG. 1) executes. Other components of system 300 may also provide input data of a temporal constraint for a task.

At 420, process modeling system 320 creates the temporal constraint object using the input data received at 410. Process modeling system 320 will use the input data to construct an object or other data representing the temporal constraint.

At 430, process modeling system 320 associates the temporal constraint object created at 420 with the intended task. Process modeling system 320 may link the temporal constraint to the intended task so that they can be referenced from/to each other.

At 440, user interface 310 presents the task with the associated temporal constraint. If a graph-based process model is used, the temporal constraint will be presented at user interface 310 using a graphical notation in the graph-based model.

In order to accurately describe a task's interaction with other tasks (e.g., temporal constraints) in a process model, multiple internal states for a task of a process model may be defined by system 300. For example, a task of the process model may not have started executing, may be currently executing, or may have already finished executing.

Figure 5:
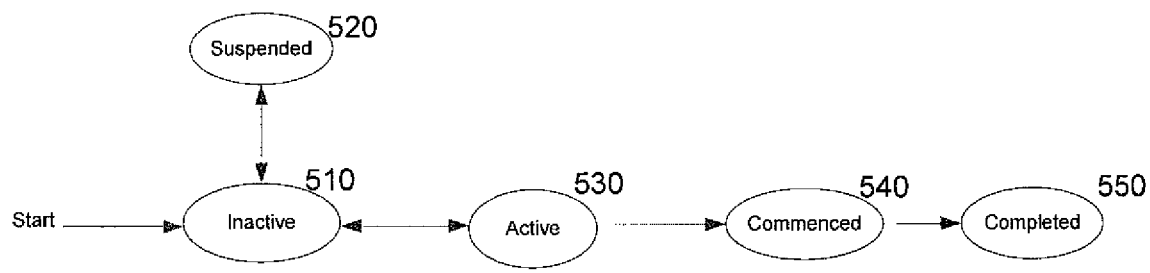
FIG. 5 depicts states of a task.

FIG. 5 depicts states 500 of a task of a process model, such as process models used at process modeling system 320. An inactive state 510 indicates that a task has been created but has not been activated. A suspended state 520 indicates that a task has been suspended and will not be activated until it is resumed. An active state 530 indicates that a task has been created and assigned. A commenced state 540 indicates that a task has started executing. A completed state 550 indicates that a task has finished execution. Compared to active state 530, which indicates that a task has been assigned for execution but the execution has not started, a commenced state 540 indicates that actual execution has already started. The states 500 enable system 300 to distinguish between an assigned-but-not-executing task at active state 530 and an assigned-and-executing task at commenced state 540. For example, a task may be created and assigned but not running because of a restriction, such as a temporal constraint. With the defined internal states 500 of a task of process models, system 300 is able to more accurately represent processes, such as business processes, workflows, and work processes.

System 300 may associate a temporal constraint with one or more states 500 of a task. For example, a task with a temporal constraint associated with its commenced state 540 includes a restriction regarding when this task may or must commence. A task with a temporal constraint associated with its completed state 550 contains a restriction about when this task may or must be completed.

A temporal constraint may also be used to indicate two types of constraints: a delay or a deadline. A delay refers to a point in time at or after which some state of a task may be reached. For example, a task in a process modeled by process modeling system 320 may reach a state (e.g., one of the states 500) at or after, but not before, the delay. In contrast, a deadline is a point in time at or before which some state of a task must be reached. For example, a task of a process modeled by process modeling system 320 may reach a state (e.g., one of the states 500) at or before, but not after, the deadline.

The delays and deadlines may be defined for each of the states 500. For example, system 300 may define one or more of the following temporal constraints; commencement delay, commencement deadline, completion delay, and completion deadline. Commencement delay indicates the point in time before which the task of a process modeled by process modeling system 320 may not commence. Commencement deadline indicates the point in time before or at which the task of a process modeled by process modeling system 320 must commence. Completion delay indicates the point in time before which the task of a process modeled by process modeling system 320 may not be completed. Completion deadline indicates the point in time before or at which the task of a process modeled by process modeling system 320 must be completed.

System 300 may further categorize temporal constraints according to the type of timing. The three types of timing defined by system 300 are absolute, relative, and interrelated. A so-called "absolute" temporal constraint specifies the time in an absolute form, e.g., Nov. 15, 2007. A so-called "relative" temporal constraint specifies the time in its relation to another state of the task, e.g., 7 days after this task enters its commenced state 540. A so-called "interrelated" type specifies the time in its relation to a state of another task, e.g., 10 days after Task$_x$ enters its completion state 540.

FIG. 6 summarizes the above-described patterns of temporal constraints defined by system 300 for use in process modeling.

Figure 7:
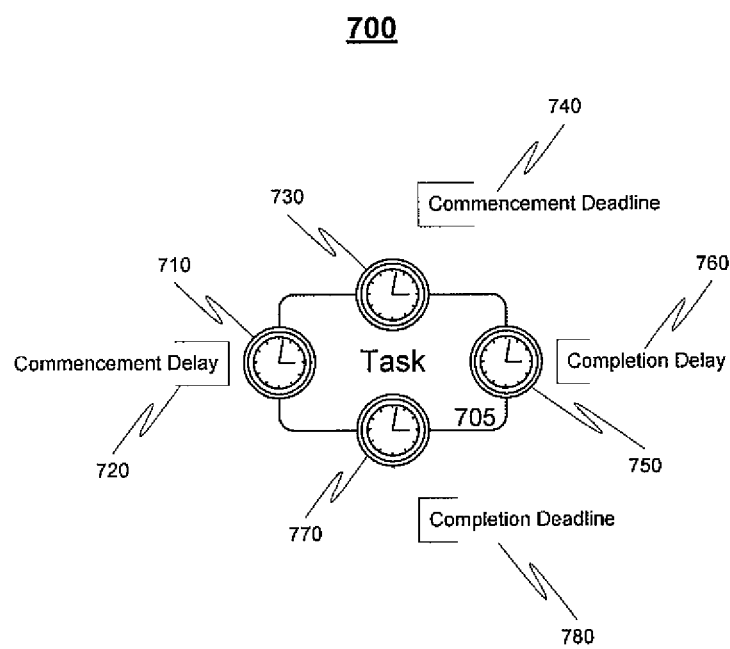
FIG. 7 depicts a graphical notation of timer patterns.

In order to define and present temporal constraints in a graph-based process model (e.g., as illustrated in FIG. 1 and FIG. 2), process modeling system 320 may graphically present a timer. Process modeling system 320 may place a timer adjacent (e.g., on the border) of its associated task, with additional semantics, depending on the actual placement of the timer. The actual placement of a timer corresponds to the temporal constraint pattern represented by the timer, FIG. 7 illustrates an example of a graphical notations of timers attached to a graphical representation of a task as defined and used by process modeling system 320. For example, process modeling system 320 may use graphical notations to model processes given the input information from user interface 310 and for providing the modeled processes to user interface 310 for presentation.

Graphical notations may be used by process modeling system 320 in a graph-based process model in which the control of the task flows from left to right. Process modeling system 320 represents a task 705 as a rectangle-shaped element with four borders: left, right, top, and bottom. Given that the control flows left to right, process modeling system 320 places a timer representing a commencement delay 710 on the left border of task 705, places a timer representing a completion delay 750 on the right border of task 705, places a timer representing a commencement deadline 730 on the top border of task 705, and places a timer representing a completion deadline 770 on the bottom border of task 705. In addition, process modeling system 320 places labels 720, 740, 760, 780 next to the timers 710, 730, 750, 770 to describe the type of timing (e.g., absolute, relative, or interrelated) of the temporal constraint represented by the timer.

During execution, process engine 330 evaluates a delay timer, such as timers 710 and 750, when the control flow reaches a task border, i.e. when a task is about to enter its commenced or completed state. Process engine 330 monitors a deadline timer, such as timers 730 and 770, before and during the task execution. Placing timers on the task borders allows process modeling system 320 to generate graph-based process models (e.g., as illustrated in FIG. 1 and FIG. 2) with enhanced clarity, i.e., a more intuitive presentation at user interface 310, when compared to representing timers as graphic elements separate from corresponding tasks.

Figure 8:
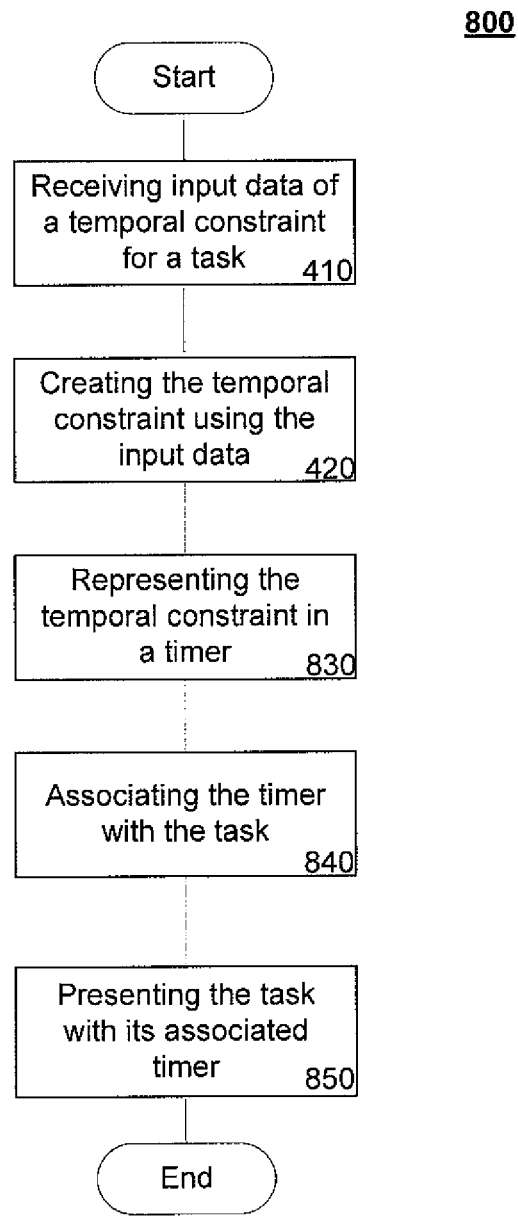
FIG. 8 depicts a process for generating task timers with timer patterns.

FIG. 8 shows another process 800 for generating a timer for a task in a graph-based process model (e.g., as illustrated in FIG. 1). Process 800 includes 410 and 420 of process 400 but also includes additional aspects as described below.

At 830, process modeling system 320 represents the temporal constraint object created at 420 as a timer. Moreover, process modeling system 320 may represent the temporal constraint as a graphical notation of a timer with a label indicating the timing, as depicted at FIG. 7.

At 840, process modeling system 320 associates the timer of 830 with the task. In addition, the association may include information about the temporal constraint patterns (as listed at FIG. 6) represented by the timer.

At 850, user interface 310 presents the task with the associated timer. In the graph-based process model, user interface 310 presents a task using one graphic element, such as the rectangle in FIG. 7. User interface 310 may also present one or more timers associated with the task. The timer may be presented at user interface 310 as a graphic element, such as timer 710 at FIG. 7. To indicate a type of timer in the user interface 310, for "absolute" deadline or delay, a specific date or time may be given, (see, e.g., 950 in FIG. 9, and 1360 in FIG. 13). A "relative" deadline or delay may refer to the state of a same task (see e.g., 1140 and 1150 in FIG. 11, which indicate T11 should start after 5 minutes when T11 is set to active, i.e., [ActiveTime]+5 mins), An "interrelated" deadline or delay may specify a point in time, in relation to another task's states (i.e., [CompletionTime]+2 Days, c.f. 1250 and 1260 in FIG. 12, which indicate T3 should start after two days when T2 is completed). In addition, user interface 310 may place the timer on the border of the graphic element representing the associated task. The actual placement of the timer depends on the temporal constraint pattern (as listed in FIG. 6) the timer represents.

Process modeling system 320 may define (e.g., by defining a data type or pattern) and/or use one or more timers representing various temporal constraint patterns, as described and depicted in FIGS. 7, 9 and 11-24. Moreover, these timers may be presented at user interface 310. In some implementations, a user at user interface 310 provides input data regarding the temporal constraints.

Figure 9:
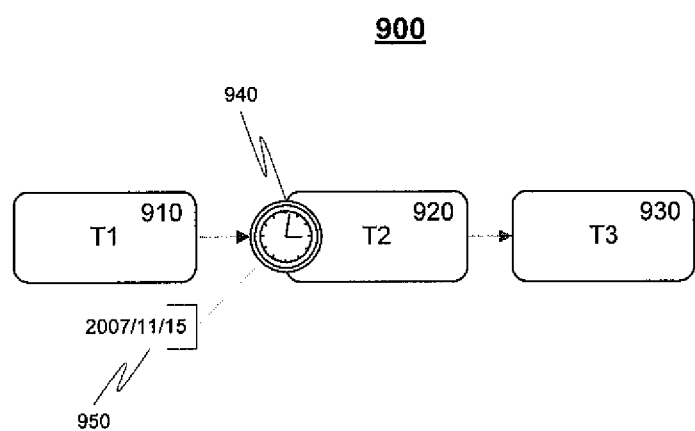
FIG. 9 depicts a graphical notation for a timer pattern of absolute commencement delay.

System 300 uses an absolute commencement delay to define an absolute time, before which the task may not commence, and at or after which the task may commence. FIG. 9 shows an example of the graphical notation 900 that process modeling system 320 may define and use for a timer of an absolute commencement delay. Moreover, the graphical notation 900 may be provided by process modeling system 320 to user interface 310 for presentation and manipulation. FIG. 9 depicts that process modeling system 320 associates Task T2 920 with a timer 940. Task T1 910 is T2's preceding task. Task T3 930 is T2's succeeding task. Process modeling system 320 may define placement of timer 940 on the left border of Task T2 920 to indicate that timer 940 is a commencement delay timer. Process modeling system 320 may define and place next to timer 940 a label 950 including an absolute time—Nov. 15, 2007, indicating an absolute timer. FIG. 9 depicts that Task T2 may start executing only on or after Nov. 15, 2007. The graphical notation of FIG. 9, as well as the other graphical notations depicted at FIGS. 7, and 11-24, may be transformed by process modeling system 320 into a rule-based process model maintained and updated by process modeling system 320.

FIG. 10 shows an example of a portion of the rule-based process model that may be result of generating an executable instance of a graph-based model. Implementations may vary and a run-time implementation need not follow a rule-based process model to implement a graph-based model. The model of FIG. 10 may be an executable instance of rules transformed from the graph-based process model shown in FIG. 9. Rule 27 represents so-called pseudo-code corresponding to the following: On the event that T2 is about to start executing, if the condition that the date is equal to or later than Nov. 15, 2007 is met, do the operation of setting T2 to its commenced state.

Figure 11:
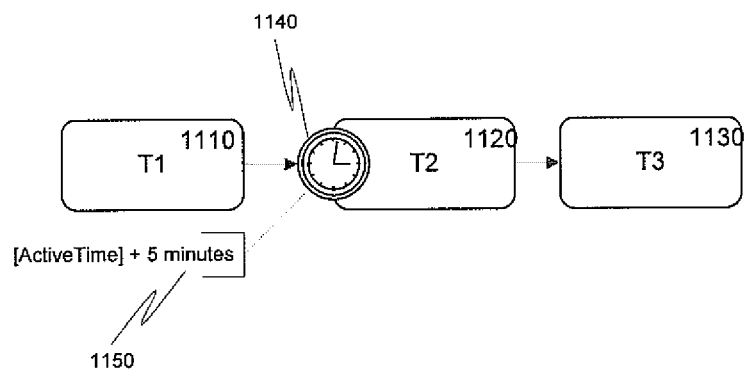
FIG. 11 depicts a graphical notation for a timer pattern of relative commencement delay.

System 300 uses a relative commencement delay to define a time relative to some state of the task, before which the task may not commence, and at or after which the task may commence. FIG. 11 shows an example of the graphical notation 1100 that process modeling system 320 may use for a timer of a relative commencement delay. Process modeling system 320 associates Task T2 1120 with a timer 1140. Task T1 1110 is T2's preceding task. Task T3 1130 is T2's succeeding task. Process modeling system 320 places the timer 1140 on the left border of Task T2 1120 to indicate that it is a commencement delay timer. Process modeling system 320 places next to timer 1140 a label 1150 containing a time relative to the task's active state—[ActiveTime]+5 minutes, indicating the timer is a relative timer. The graphical notation 1100 represents that Task T2 may start executing no earlier than 5 minutes after T2 enters the active state.

Figure 12:
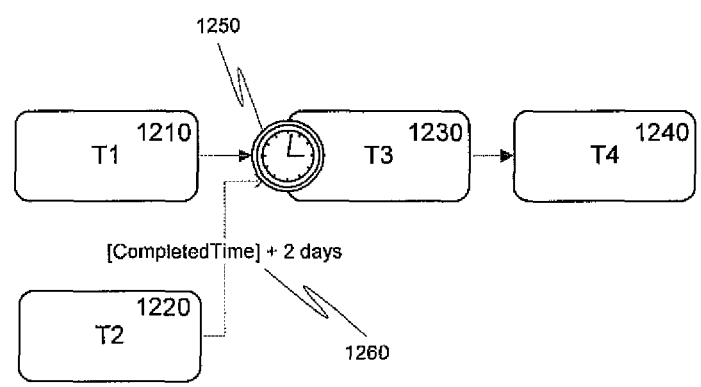
FIG. 12 depicts a graphical notation for a timer pattern of interrelated commencement delay.

System 300 uses an interrelated commencement delay to define a time relative to a state of another task, before which the task may not commence, and at or after which the task may commence. FIG. 12 shows an example of the graphical notation 1200 that process modeling system 320 may use for a timer of an interrelated commencement delay. Process modeling system 320 associates Task T3 1230 with a timer 1250. Task T1 1210 is T3's preceding task. Task T4 1240 is T3's succeeding task. Task T2 1220 is a separate task. Process modeling system 320 places the timer 1250 on the left border of Task T3 1230 to indicate that it is a commencement delay timer. Process modeling system 320 places a label 1260 next to timer 1250 and connected to Task T2 1220 containing a time relative to T2's completed state—[CompletedTime]+2 days, indicating the timer is an interrelated timer. Graphical notation 1200 may be defined by and used by system 300 to represent that Task T3 may start executing no earlier than 2 days after T2 enters T2's completed state.

Figure 13:
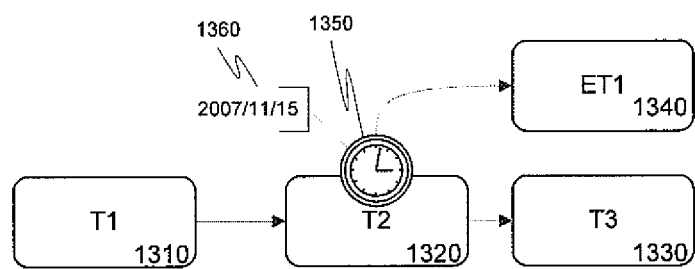
FIG. 13 depicts a graphical notation for a timer pattern of absolute commencement deadline.

System 300 uses an absolute commencement deadline to define an absolute time by which a task must commence. FIG. 13 shows an example of the graphical notation 1300 that process modeling system 320 may use for a timer of an absolute commencement deadline. Process modeling system 320 associates Task T2 1320 with a timer 1350. Task T1 1310 is T2's preceding task. Task T3 1330 is T2's succeeding task. Process modeling system 320 places the timer 1350 on the top border of Task T2 1320 to indicate that timer 1350 is a commencement deadline timer. Process modeling system 320 places a label 1360 next to timer 1350 including an absolute time—Nov. 15, 2007, indicating the timer is an absolute timer. Process modeling system 320 also connects timer 1350 to a separate task ET1 1340. Process modeling system 320 uses ET1 to represent an escalated task that may start executing once T2's deadline is missed. Graphical notation 1300 may be defined and used by system 300 to represent that Task T2 must start executing on or before Nov. 15, 2007; if Task T2 has not entered the Commenced state after Nov. 15, 2007, an escalated task ET1 will start executing. When a task deadline is missed, one option is to abandon the respective task and start the escalated task; the other option is to continue the respective task and start the escalated task in parallel. The choice between these two options is up to the user of the system 300 and may depend on the type of the task and the circumstances. In this example, Task T2 may still commence or may not commence anymore after Nov. 15, 2007.

Figure 14:
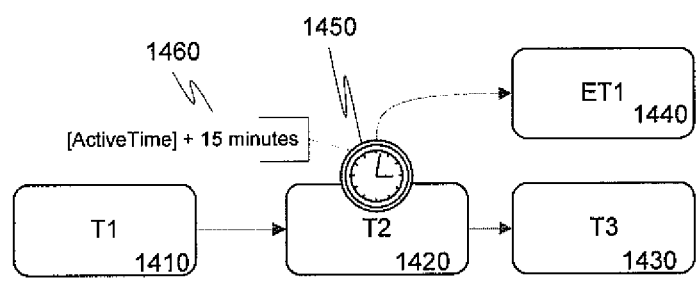
FIG. 14 depicts a graphical notation for a timer pattern of relative commencement deadline.

System 300 uses a relative commencement deadline to define a time relative to some state of the task by which the task must commence. FIG. 14 shows an example of the graphical notation 1400 that process modeling system 320 may use for a timer of a relative commencement deadline. Process modeling system 320 associates Task T2 1420 with a timer 1450. Task T1 1410 is T2's preceding task. Task T3 1430 is T2's succeeding task. Process modeling system 320 places the timer 1450 on the top border of Task T2 1420 to indicate that it is a commencement deadline timer Process modeling system 320 places the label 1460 next to the timer 1450 containing a time relative to the task's Active state—[ActiveTime]+15 minutes, indicating the timer is a relative timer. Process modeling system 320 also connects the timer 1450 to a separate task ET1 1440. Process modeling system 320 uses ET1 to represent an escalated task that may start executing once T2's deadline is missed. Graphical notation 1400 may be used and defined by system 300 to represent that Task T2 must start executing no later than 15 minutes after T2 enters the Active state; if Task T2 has not entered the commenced state in 15 minutes after it enters the Active state, an escalated task ET1 will start executing. When a task deadline is missed, one option is to abandon the respective task and start the escalated task; the other option is to continue the respective task and start the escalated task in parallel. Whether Task T2 may still commence or must be abandoned after 15 minutes after T2 enters the active state is up to the user of system 300 and may depend on the type of the task and the circumstances.

Figure 15:
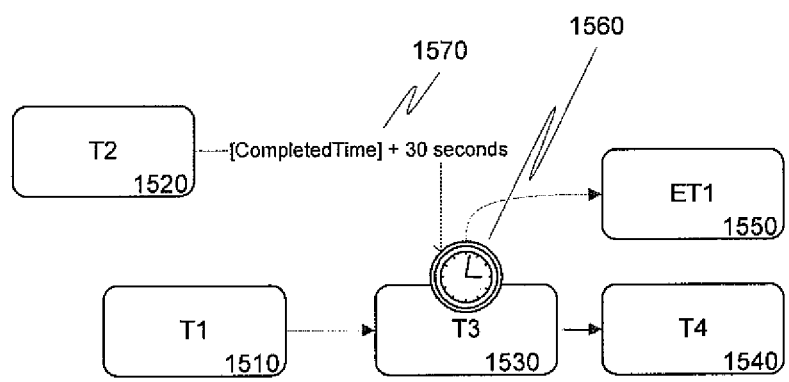
FIG. 15 depicts a graphical notation for a timer pattern of interrelated commencement deadline.

System 300 uses an interrelated commencement deadline to define a time relative to some state of another task by which the task must commence. FIG. 15 shows an example of the graphical notation 1500 that process modeling system 320 may use for a timer 1560 of an interrelated commencement deadline. Process modeling system 320 associates Task T3 1530 with a timer 1560. Task T1 1510 is T3's preceding task. Task T4 1540 is T3's succeeding task. Task T2 1520 is a separate task. Process modeling system 320 places the timer 1560 on the top border of Task T3 1530 to indicate that it is a commencement deadline timer. Process modeling system 320 places the label 1570 next to the timer 1560 and connected to Task T2 1520 containing a time relative to T2's Completed state—[CompletedTime]+30 seconds, indicating the timer is an interrelated timer. Process modeling system 320 also connects the timer 1560 to a separate task ET1 1550. Process modeling system 320 uses ET1 to represent an escalated task that may start executing once T3's deadline is missed. Graphical notation 1500 may be defined and used by system 300 to represents that Task T3 must start executing no later than 30 seconds after T2 enters the completed state; if Task T3 has not entered the commenced state in 30 seconds after T2 enters the completed state; an escalated task ET1 will start executing. When a task deadline is missed, one option is to abandon the respective task and start the escalated task; the other option is to continue the respective task and start the escalated task in parallel. Whether Task T3 may still commence or must be abandoned after 30 seconds after T2 enters the completed state is up to the user of system 300 and may depend on the type of the task and the circumstances.

Figure 16:
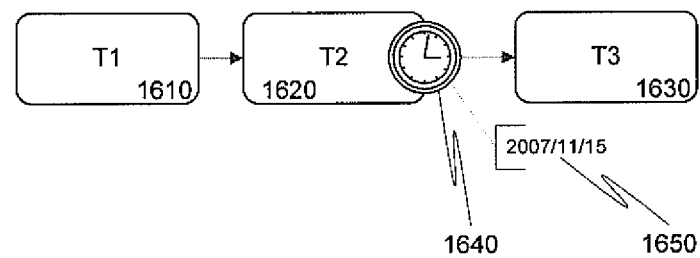
FIG. 16 depicts a graphical notation for a timer pattern of absolute completion delay.

System 300 uses an absolute completion delay to define an absolute time, before which the task may not be completed, and at or after which the task may be completed. FIG. 16 shows an example of the graphical notation 1600 that process modeling system 320 may define and use for a timer 1640 of an absolute completion delay. Process modeling system 320 associates Task T2 1620 with a timer 1640. Task T1 1610 is T2's preceding task. Task T3 1630 is T2's succeeding task. Process modeling system 320 places the timer 1640 on the right border of Task T2 1620 to indicate that it is a completion delay timer. Process modeling system 320 places the label 1650 next to the timer 1640 containing an absolute time—Nov. 15, 2007, indicating the timer is an absolute timer. Graphical notation 1600 may be defined and used by system 300 to represent that Task T2 may be completed only on or after Nov. 15, 2007.

Figure 17:
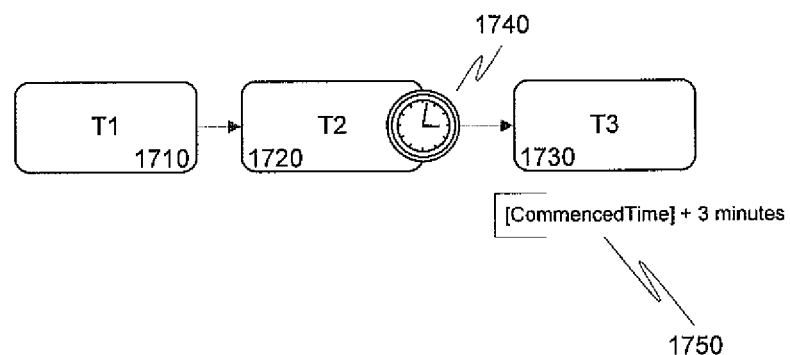
FIG. 17 depicts a graphical notation for a timer pattern of relative completion delay.

System 300 uses a relative completion delay to define a time relative to some state of the task, before which the task may not be completed, and at or after which the task may be completed. FIG. 17 shows an example of the graphical notation 1700 that process modeling system 320 may use for a timer 1740 of a relative completion delay. Process modeling system 320 associates Task T2 1720 with a timer 1740. Task T1 1710 is T2's preceding task. Task T3 1730 is T2's succeeding task. Process modeling system 320 places the timer 1740 on the right border of Task T2 1720 to indicate that it is a completion delay timer. Process modeling system 320 places the label 1750 next to the timer 1740 containing a time relative to the task's commenced state—[Commenced-Time]+3 minutes, indicating the timer is a relative timer. Graphical notation 1700 may be defined and used by system 300 to represent that Task T2 may be completed no earlier than 3 minutes after T2 enters the Commenced state.

Figure 18:
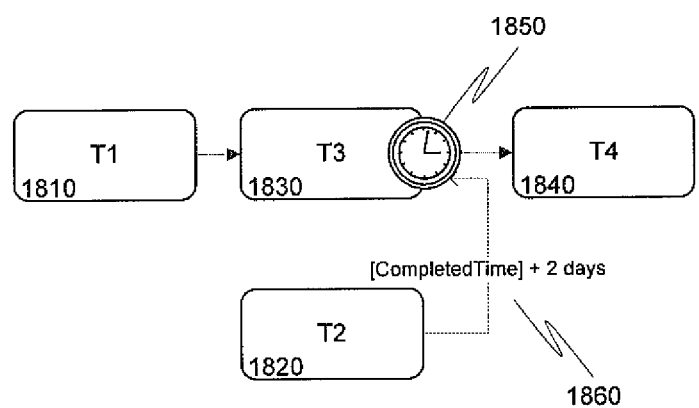
FIG. 18 depicts a graphical notation for a timer pattern of interrelated completion delay.

System 300 uses an interrelated completion delay to define a time relative to some state of another task, before which the task may not be completed, and at or after which the task may be completed. FIG. 18 shows an example of the graphical notation 1800 that process modeling system 320 may use for a timer 1850 of an interrelated completion delay. Process modeling system 320 associates Task T3 1830 with a timer 1850. Task T1 1810 is T3's preceding task. Task T4 1840 is T3's succeeding task. Task T2 1820 is a separate task. Process modeling system 320 places the timer 1850 on the right border of Task T3 1830 to indicate that it is a completion delay timer. Process modeling system 320 places the label 1860 next to the timer 1850 and connected to Task T2 1820 containing a time relative to T2's completed state—[Completed-Time]+2 days, indicating the timer is an interrelated timer. Graphical notation 1800 may be used and defined by system 300 to represent that Task T3 may be completed no earlier than 2 days after T2 enters the completed state.

Figure 19:
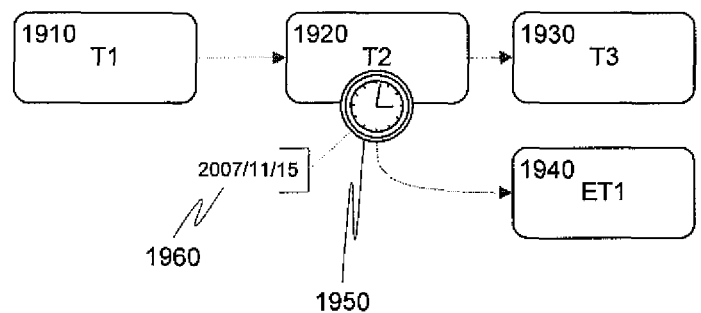
FIG. 19 depicts a graphical notation for a timer pattern of absolute completion deadline.

System 300 uses an absolute completion deadline to define an absolute time by which the task must be completed. FIG. 19 shows an example of the graphical notation 1900 that process modeling system 320 may use for a timer 1950 of an absolute completion deadline. Process modeling system 320 associates Task T2 1920 with a timer 1950. Task T1 1910 is T2's preceding task. Task T3 1930 is T2's succeeding task. Process modeling system 320 places the timer 1950 on the bottom border of Task T2 1920 to indicate that it is a completion deadline timer. Process modeling system 320 places the label 1960 next to the timer 1950 containing an absolute time—Nov. 15, 2007, indicating the timer is an absolute timer. Process modeling system 320 also connects the timer 1950 to a separate task ET1 1940. Process modeling system 320 uses ET1 to represent an escalated task that may start executing once T2's deadline is missed. Graphical notation 1900 may be used and defined by system 300 to represent that Task T2 must be completed on or before Nov. 15, 2007; if Task T2 has not entered the Completed state after Nov. 15, 2007, an escalated task ET1 will start executing. When a task deadline is missed, one option is to abandon the respective task and start the escalated task; the other option is to continue the respective task and start the escalated task in parallel. Whether Task T2 may still be completed or must be abandoned after Nov. 15, 2007 is up to the user of system 300 and may depend on the type of the task and the circumstances.

Figure 20:
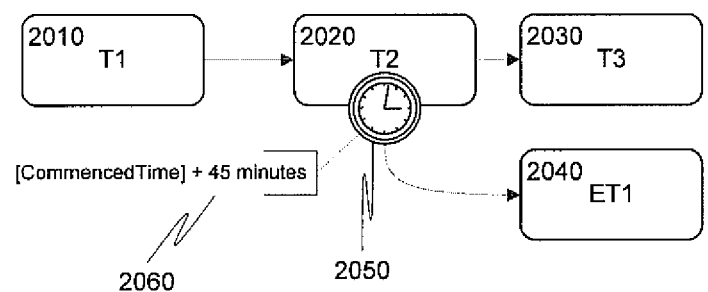
FIG. 20 depicts a graphical notation for a timer pattern of relative completion deadline.

System 300 uses a relative completion deadline to define a time relative to some state of the task by which the task must complete. FIG. 20 shows an example of the graphical notation 2000 that process modeling system 320 may use for a timer 2050 of a relative completion deadline. Process modeling system 320 associates Task T2 2020 with timer 2050. Task T1 2010 is T2's preceding task. Task T3 2030 is T2's succeeding task. Process modeling system 320 places the timer 2050 on the bottom border of Task T2 2020 to indicate that it is a completion deadline timer. Process modeling system 320 places the label 2060 next to the timer 2050 containing a time relative to the task's commenced state—[Commenced-Time]+45 minutes, indicating the timer is a relative timer. Process modeling system 320 also connects the timer 2050 to a separate task ET1 2040. Process modeling system 320 uses ET1 to represent an escalated task that may start executing once T2's deadline is missed. Graphical notation 2000 may be used and defined by system 300 to represent that Task T2 must complete no later than 45 minutes after T2 enters the commenced state; if Task T2 has not entered the completed state in 45 minutes after it enters the commenced state, an escalated task ET1 will start executing. When a task deadline is missed, one option is to abandon the respective task and start the escalated task; the other option is to continue the respective task and start the escalated task in parallel. Whether Task T2 may still be completed or must be abandoned after 45 minutes after it enters the commenced state is up to the user of system 300 and may depend on the type of the task and the circumstances.

Figure 21:
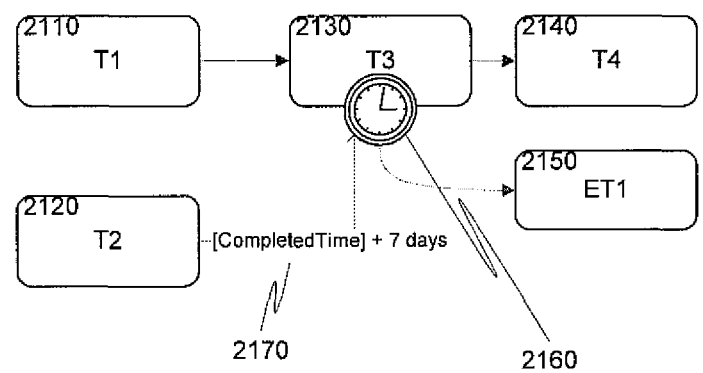
FIG. 21 depicts a graphical notation for a timer pattern of interrelated completion deadline.

System 300 uses an interrelated completion deadline to define a time relative to some state of another task by which the task must complete. FIG. 21 shows an example of the graphical notation 2100 that process modeling system 320 may use for a timer 2160 of an interrelated complete deadline. Process modeling system 320 associates Task T3 2130 with timer 2160. Task T1 2110 is T3's preceding task. Task T4 2140 is T3's succeeding task. Task T2 2120 is a separate task. Process modeling system 320 places the timer 2160 on the bottom border of Task T3 2130 to indicate that it is a completion deadline timer. Process modeling system 320 places the label 2170 next to the timer 2160 and connected to Task T2 2120 containing a time relative to T2's completed state—[CompletedTime]+7 days, indicating the timer is an interrelated timer. Process modeling system 320 also connects the timer 2160 to a separate task ET1 2150. Process modeling system 320 uses ET1 to represent an escalated task that may start executing once T3's deadline is missed. Graphical notation 2100 may be used and defined by system 300 to represent that Task T3 must complete no later than 7 days after T2 enters the completed state. If Task T3 has not entered the completed state in 7 days after T2 enters the completed state, an escalated task ET1 will start executing. When a task deadline is missed, one option is to abandon the respective task and start the escalated task; the other option is to continue the respective task and start the escalated task in parallel. Whether Task T3 may still be completed or must be abandoned after 7 days after T2 enters the completed state is up to the user of system 300 and may depend on the type of the task and the circumstances.

Figure 22:
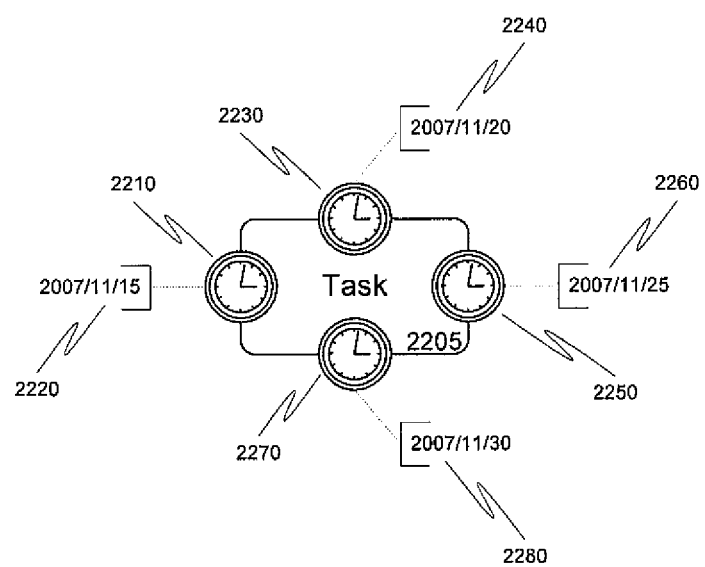
FIG. 22 depicts a graphical notation for multiple timer patterns of a task.

System 300 may associate a task with multiple timers. FIG. 22 shows an example of the graphical notation 2200 that process modeling system 320 may use to represent a task with a plurality of timers 2210, 2230, 2250, and 2270. Process modeling system 320 associates Task 2205 with four timers 2210, 2230, 2250, 2270, one on each of its four borders. Process modeling system 320 labels each timer with a date 2220, 2240, 2260, 2280. The graphical notation 2200 of the four timers 2210, 2230, 2250, 2270 may be used and defined by system 300 to represent that Task 2205 may enter the commenced state on or after Nov. 15, 2007 but must enter the commenced state on or before Nov. 20, 2007; and may enter the completed state on or after Nov. 25, 2007 but must enter the completed state on or before Nov. 30, 2007.

Figure 23:
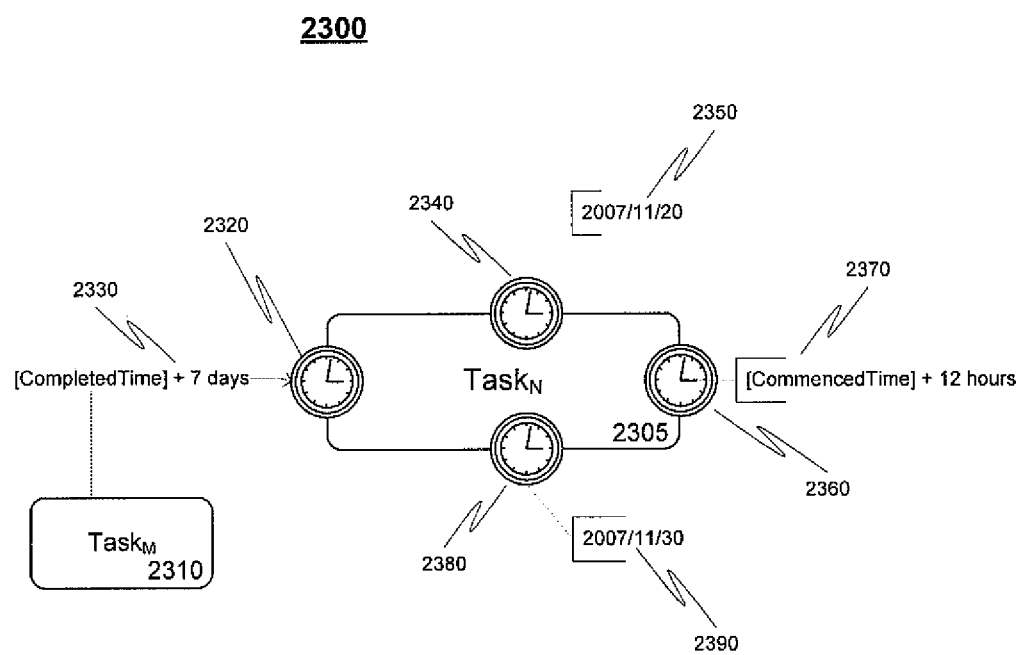
FIG. 23 depicts a graphical notation for multiple timer patterns of another task.

FIG. 23 shows another example of the graphical notation 2300 of a task with a plurality of timers 2320, 2340, 2360, 2380. Process modeling system 320 associates Task 2305 with four timers 2320, 2340, 2360, 2380, one on each of the four borders of Task 2305. Process modeling system 320 labels each timer with a date or time 2330, 2350, 2370, and 2390. The graphical notation 2300 and the plurality of timers 2320, 2340, 2360, 2380 may be used and defined by system 300 to indicate that Task$_N$ 2305 may enter the commenced state no earlier than 7 days after Task$_M$ enters its completed state but must enter the commenced state on or before Nov. 20, 2007; and may enter the completed state no earlier than 12 hours after Task$_N$ enters its commenced state but must enter the completed state on or before Nov. 30, 2007. The graphical notation of 2300 as well as the graphical notations of FIGS. 7 and 9-24 may be created (e.g., generated) at system 300, maintained by system 300, and presented at user interface 310.

Figure 24:
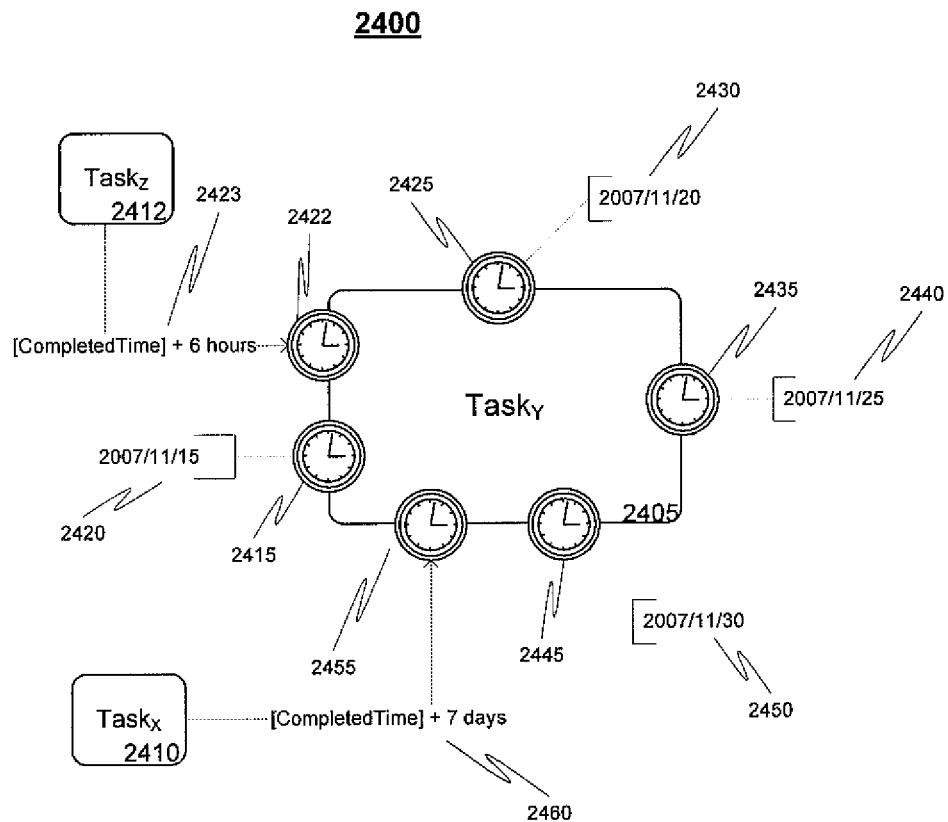
FIG. 24 depicts a graphical notation for multiple timers of the same timer pattern.

System 300 may also associate a task with multiple timer of one temporal constraint pattern. FIG. 24 shows an example of the graphical notation 2400 that process modeling system 320 may use to represent a task with a plurality of timers 2415 and 2422, or 2445 and 2455 of one temporal constraint pattern. Process modeling system 320 associates Task$_Y$ 2405 with six timers 2415, 2422, 2425, 2435, 2445, 2455, one on each of its two borders and two on each of its the other two borders. Process modeling system 320 labels each timer with a date or time 2420, 2423, 2430, 2440, 2450, 2460. The graphical notation of the six timers indicates that Task$_Y$ 2405 may enter the commenced state no earlier than Nov. 15, 2007, may enter the commenced state no earlier than 6 hours after Task$_Z$ enters its completed state, but must enter the commenced state on or before Nov. 20, 2007; may enter the completed state no earlier than Nov. 25, 2007, but must enter the completed state on or before Nov. 30, 2007, and must enter the completed state no later than 7 days after Task$_X$ enters its completed state. The combined effect of two commencement delay timers 2415, 2422 is that Task$_Y$ may enter the commencement state only on or after the later time between Nov. 15, 2007 and 6 hours after Task$_Z$ enters its completed state. The combined effect of two completion deadline timers 2445, 2455 is that Task$_Y$ must enter the Completed state on or before the earlier time between Nov. 30, 2007 and 7 days after Task$_X$ enters its completed state.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

The term user may refer to any entity including a human as well as another processor, such as a computer.

Although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flows depicted in the accompanying figures and/or described herein do not require the particular order shown, or sequential order, to achieve desirable results. Other embodiments may be within the scope of the following claims.

What is claimed:

1. A computer-implemented method comprising:
   receiving, by at least one processor, an input representative of a temporal constraint for a task of a graph-process model, the temporal constraint defining at least one of a commencement delay, a completion delay, a commencement deadline, and a completion deadline;
   associating, by the at least one processor, the task with the temporal constraint created based on the received input, the temporal constraint defined to have a placement on the task of the graph-process model based on a type of temporal constraint, wherein the placement of the temporal constraint is based on a graphical element, the graphical element comprising a left border, a right border, a top border and a bottom border, wherein the left border is configured to accept placement of the temporal constraint when the temporal constraint corresponds to the commencement delay, wherein the right border is configured to accept placement of the temporal constraint when the temporal constraint corresponds to the completion delay, wherein the top border is configured to accept placement of the temporal constraint when the temporal constraint corresponds to the commencement deadline, and wherein the bottom border is configured to accept placement of the temporal constraint when the temporal constraint corresponds to the completion deadline; and
   providing, by the at least one processor, the task and the temporal constraint to configure the graph-process model.

2. The computer-implemented method of claim 1, wherein receiving further comprises:
   receiving, from a user interface, the input representative of the temporal constraint.

3. The computer-implemented method of claim 1 further comprising:
   providing the task and the temporal constraint to the user interface for presentation.

4. The computer-implemented method of claim 1, wherein associating further comprises:
   defining the placement of the temporal constraint based on whether the type of the temporal constraint represents the deadline or the delay.

5. The computer-implemented method of claim 1, wherein associating further comprises:
   linking a second task to the temporal constraint, the second task being an escalated task.

6. The computer-implemented method of claim 1, wherein associating further comprises:
   defining the graphical element to include the left border, the right border, the top border, and the bottom border.

7. The computer-implemented method of claim 6, wherein the temporal constraint further comprises an absolute commencement delay.

8. The computer-implemented method of claim 6, wherein the temporal constraint further comprises a relative commencement delay.

9. The computer-implemented method of claim 6, wherein the temporal constraint further comprises an interrelated commencement delay.

10. A non-transitory computer-readable medium comprising instructions that when performed by a computer result in operations comprising:
    receiving, by at least one processor, an input representative of a temporal constraint for a task of a graph-process model, the temporal constraint defining at least one of a commencement delay, a completion delay, a commencement deadline, and a completion deadline;
    associating, by the at least one processor, the task with the temporal constraint created based on the received input, the temporal constraint defined to have a placement on the task of the graph-process model based on a type of temporal constraint, wherein the placement of the temporal constraint is based on a graphical element, the graphical element comprising a left border, a right border, a top border and a bottom border, wherein the left border is configured to accept placement of the temporal constraint when the temporal constraint corresponds to the commencement delay, wherein the right border is configured to accept placement of the temporal constraint when the temporal constraint corresponds to the completion delay, wherein the top border is configured to accept placement of the temporal constraint when the temporal constraint corresponds to the commencement deadline, and wherein the bottom border is configured to accept placement of the temporal constraint when the temporal constraint corresponds to the completion deadline; and providing, by the at least one processor, the task and the temporal constraint to configure the graph-process model.

11. The non-transitory computer-readable medium of claim 10, wherein receiving further comprises:

receiving, from a user interface, the input representative of the temporal constraint.

12. The non-transitory computer-readable medium of claim 10 further comprising:

providing the task and the temporal constraint to the user interface for presentation.

13. A system comprising:

at least one processor; and at least one memory, wherein the at least one processor and the at least one memory are configured to perform operations comprising:

receiving an input representative of a temporal constraint for a task of a graph-process model, the temporal constraint defining at least one of a commencement delay, a completion delay, a commencement deadline, and a completion deadline;

associating the task with the temporal constraint created based on the received input, the temporal constraint defined to have a placement on the task of the graph-process model based on a type of temporal constraint, wherein the placement of the temporal constraint is based on a graphical element, the graphical element comprising a left border, a right border, a top border and a bottom border, wherein the left border is configured to accept placement of the temporal constraint when the temporal constraint corresponds to the commencement delay, wherein the right border is configured to accept placement of the temporal constraint when the temporal constraint corresponds to the completion delay, wherein the top border is configured to accept placement of the temporal constraint when the temporal constraint corresponds to the commencement deadline, and wherein the bottom border is configured to accept placement of the temporal constraint when the temporal constraint corresponds to the completion deadline; and providing the task and the temporal constraint to configure the graph-process model.

14. The system of claim 13, wherein receiving further comprises:

receiving, from a user interface, the input representative of the temporal constraint.

15. The system of claim 13 further comprising:

providing the task and the temporal constraint to the user interface for presentation.

* * * * *